(12) United States Patent
Acuña-Rohter et al.

(10) Patent No.: US 10,453,123 B2
(45) Date of Patent: Oct. 22, 2019

(54) MARKET DRIVEN IMPLIED TRADE RESOLUTION

(75) Inventors: José A. Acuña-Rohter, Park Ridge, IL (US); Paul Callaway, Chicago, IL (US); Pearce Peck-Walden, Chicago, IL (US); Barry L. Galster, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 808 days.

(21) Appl. No.: 13/281,782

(22) Filed: Oct. 26, 2011

(65) Prior Publication Data
US 2013/0110694 A1 May 2, 2013

(51) Int. Cl.
*G06Q 40/00* (2012.01)

(52) U.S. Cl.
CPC ................... *G06Q 40/00* (2013.01)

(58) Field of Classification Search
CPC .................................................. G06Q 40/00
USPC ........................................................ 705/37
See application file for complete search history.

(56) References Cited

U.S. PATENT DOCUMENTS

| | | |
|---|---|---|
| 2008/0010187 A1 | 1/2008 | Farrell et al. |
| 2010/0017321 A1 | 1/2010 | Callaway |
| 2010/0174633 A1* | 7/2010 | Milne et al. ..................... 705/37 |
| 2010/0332374 A1* | 12/2010 | Adcock ................. G06Q 30/06 705/37 |
| 2011/0055067 A1 | 3/2011 | Milne et al. |
| 2011/0055069 A1 | 3/2011 | Pazner |
| 2012/0330816 A1* | 12/2012 | Farrell et al. ................... 705/37 |

OTHER PUBLICATIONS

International Search Report and Written Opinion from related International application No. PCT/US2012/061792 dated Dec. 28, 2012.
International Preliminary Report on Patentability, from Application No. PCT/US2012/061792, dated Apr. 29, 2014, WO.
Extended European Search Report, from EP Application No. 12843304.2, dated May 11, 2015, EP.

\* cited by examiner

*Primary Examiner* — Ojo O Oyebisi
(74) *Attorney, Agent, or Firm* — Lempia Summerfield Katz LLC

(57) ABSTRACT

An electronic trading system utilizes a Match Engine that receives orders, stores them internally, calculates tradable combinations and advertises the availability of real and implied orders in the form of market data. New tradable items defined as combinations of other tradable items may be included in the calculation of tradable combinations. The disclosed embodiments relate to detection of market conditions where identification of implied opportunities may, for example, subvert real orders resulting in undesirable effects. Under circumstances where such undesirable effects are likely to occur, identification of implied opportunities may be delayed thereby allowing market forces to attempt to resolve the aberrant market conditions and avoid the undesirable effects.

36 Claims, 5 Drawing Sheets

MARKET DRIVEN IMPLIED TRADE RESOLUTION

TECHNICAL FIELD

The following disclosure relates to software, systems, and methods for electronic trading in a commodities exchange, derivatives exchange or similar business involving tradable items where orders from buyers are matched with orders from sellers.

BACKGROUND

Electronic trading systems allow entry of one or more bids and/or offers for a particular tradable item, which in futures trading is referred to as a contract. The simplest possible futures contract is the outright contract defined by a product and a delivery period. It is also possible to define combination contracts, such as a spread contract, which is defined as the simultaneous purchase and sale of two or more tradable items, such as futures contracts for different months, different commodities, or different grades of the same commodity. The bid and offer components of a spread contract are termed the bid leg and the offer leg respectively.

Electronic trading systems accept bids and offers, whether for outright contracts or spreads, in the form of orders, also referred to as real orders because they consist of data entered by traders either directly or by computing devices under their control. A real order for an outright contract may be referred to as an "outright order" or simply as an "outright." Real orders may be entered for any tradable item, such as outright contracts or combination contracts, in the system including, but not limited to, futures, options, inter-commodity spreads, intra-commodity spreads, futures strips, calendar spreads, butterfly spreads, condor spreads, crack spreads, straddles, and strangles.

Implied orders, unlike real orders, are orders which may not match against a single/direct counter order and may be identified and/or generated by the system on the behalf of traders who have entered real orders, i.e. an implied order may comprise one or more orders which, if entered, would allow the real orders to be executed. The trading system may identify, or otherwise recognize, implied orders, i.e. identify a real order entered by a trader which is counter to, whether intended by the trader or not, a combination of two or more other real orders, and/or generate an implied order, i.e. based on two or more real orders, generate and subsequently advertise for/solicit an order which would allow the two or more real orders to trade. Implied orders, however, are typically recognized/identified and/or generated generally with the purpose of increasing overall market liquidity, i.e. in situations where it is less likely a trader would actually enter such an order or where the trading system wishes to provide additional opportunities for matching trades in the markets for the particular real orders, and may be expressed, depending upon the application, in the form of the one or more requisite counter orders and/or in the form of one or more orders which would attract a trader to enter the one or more requisite counter orders. For example, an implied spread order may be derived from two real outright orders. In one application, trading systems identify and create, i.e. calculate, the "derived" or "implied" order and display, or otherwise advertise, the market that results from the creation of the implied order as a market that may be traded against in order to attract/solicit a trader to place the requisite counter order(s). If a trader enters an order to trade against this implied market, then the newly entered order and the real orders that were used to derive the implied market may be executed as matched trades. Alternatively, or in addition thereto, where markets already exist, trading systems may identify implied order opportunities, referred to simply as implied opportunities, e.g. an existing market, based on real orders, where an incoming real order may be identified and/or a resting order may be found which may satisfy the implied relationship between the real orders. For example, where two real orders imply a spread there between, there may already exist a market for the spread instrument where a suitable counter-order may be entered by a trader or is presently resting. Where the identification of an implied opportunity fails to find a suitable order, the trading system may then generate and list/advertise a suitable implied order to be traded against.

Implied orders frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied orders at better prices will encourage traders to enter the opposing orders to trade with them while identifying implied opportunities among existing outright orders increases the number of matched trades, thereby improving market liquidity. The more implied order combinations that the Match Engine of a trading system can calculate or identify, the greater these benefits will be and the more the exchange will benefit from increased transaction volume.

Generating an implied market and/or identifying implied opportunities are complex processes because of, among other considerations, the large number of potential order combinations upon which implied orders may be based. For example, a single commodity product available in 72 different delivery months will have 72 possible outright contracts, each of which may have at least one resting buy order or resting sell order. Accordingly, there are 2556 (=(72*71)/2) potential spread contracts, noting that the buy/sell combination and sell/buy combination of any two outright contracts both correspond to the same spread contract. For a simple implied order where two real orders combine to form a third order, there are 5256 (=2*72+2*2556) choices of the order to imply and 71 (=72−1) ways to choose a combination of two orders implying any given third order, leading to 373,156 combinations overall. As the number and complexity of the contracts involved in implication gets larger, the number of possible combinations grows exponentially.

For these reasons, trading systems that derive implied orders or identify implied opportunities are often limited by computing capacity and speed. Conventional trading systems may not have an efficient method of determining all possible or best possible implied markets, especially when the order combinations involve more than a few orders.

DETAILED DESCRIPTION

The disclosed embodiments relate to detection of market conditions where identification of implied opportunities may, for example, subvert real orders resulting in undesirable effects. Under circumstances where such undesirable effects are likely to occur, identification of implied opportunities may be delayed thereby allowing market forces to attempt to resolve the aberrant market conditions and avoid the undesirable effects.

The order matching function in an electronic trading system is typically performed by a specialized component referred to as a Match Engine, of which there may be multiple instances. A Match Engine is a specialized order matching component that receives orders, stores them internally, calculates tradable combinations, including identifying implied order opportunities and/or generating implied orders, and advertises the availability of real and implied orders in the form of market data. Traders, in turn, utilize the trading system to respond to the market data by sending additional orders. These additional orders are received by the Match Engine, which then attempts to match them with previously received, referred to as "resting," orders or combinations thereof. The Match Engine executes the possible trades and communicates the results.

The embodiments are illustrated and described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved are readily extended to other protocols and interfaces in a predictable fashion.

Regulated and unregulated exchanges and other electronic trading services make use of electronic trading systems. For example, the following embodiments are applicable to any trading or futures market in the United States or elsewhere in the world, for example, the Chicago Board of Trade (CBOT), the Chicago Mercantile Exchange (CME), the Bolsa de Mercadorias e Futoros in Brazil (BMF), the London International Financial Futures Exchange, the New York Mercantile Exchange (NYMEX), the Kansas City Board of Trade (KCBT), MATIF (in Paris, France), the London Metal Exchange (LME), the Tokyo International Financial Futures Exchange, the Tokyo Commodity Exchange for Industry (TOCOM), the Meff Renta Variable (in Spain), the Dubai Mercantile Exchange (DME), and the Intercontinental Exchange (ICE).

Figure 1:
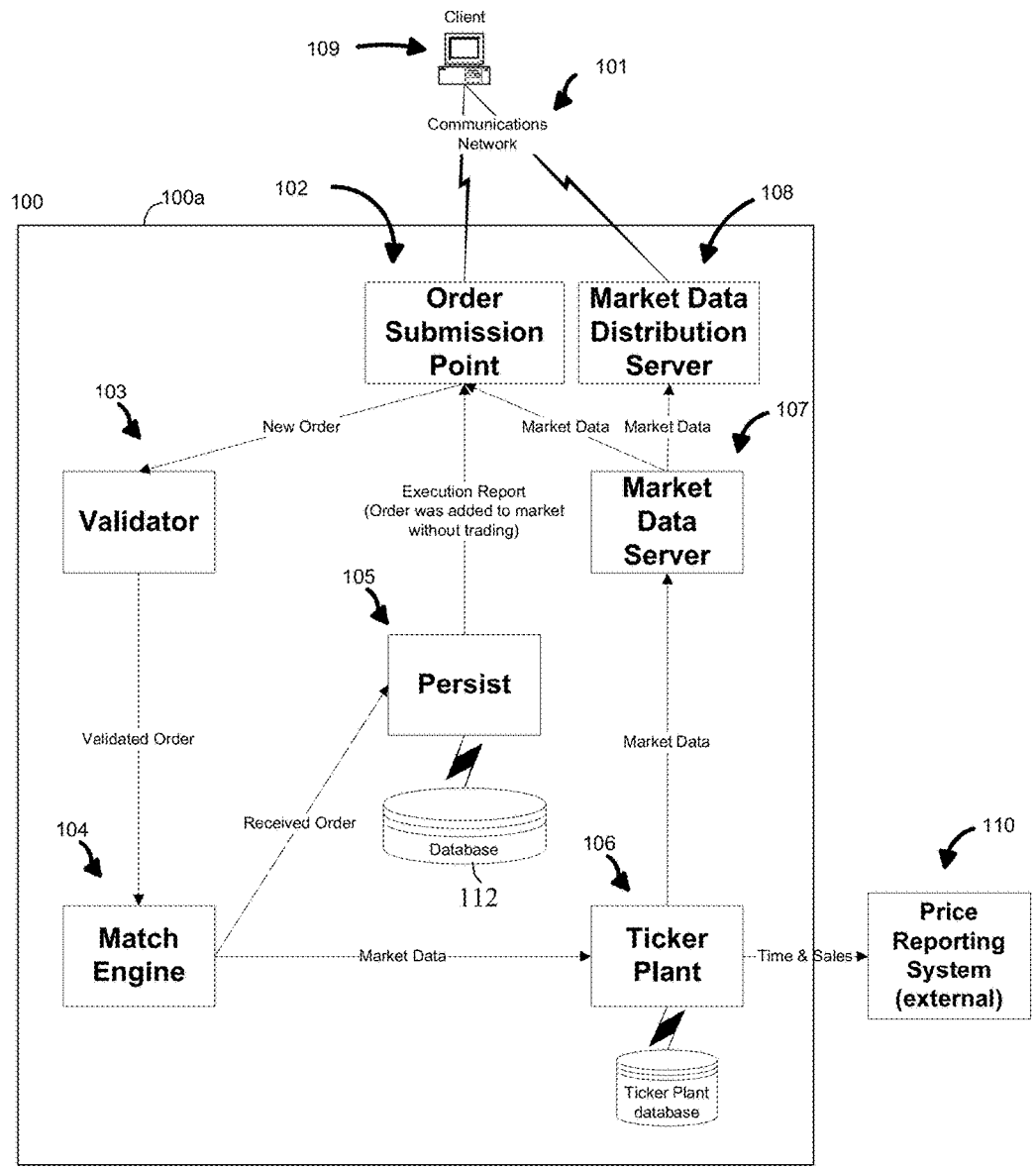
FIG. 1 illustrates an exemplary electronic trading system.

An example of the functional layout of such an electronic trading system 100 is shown in FIG. 1. In this example, the electronic trading system 100 includes the components shown within the system boundary 100a. The client 109 and the price reporting system 110 are shown outside the system boundary 100a but communicate with the electronic trading system 100 using a wired and/or wireless, proprietary and/or non-proprietary communications network 101, such as the Internet, and may include the network 420 described below with respect to FIG. 4. The term client is used generically to indicate any user operated device or other networked device capable of communicating with the electronic trading system 100. The electronic trading system 100, as well as each client, may be implemented as a computer 400 as described below with respect to FIG. 4.

In an exemplary implementation, the client 109 transmits electronic orders to an Order Submission Point 102 by way of the communication network 101, such as the Internet. It is contemplated that Order Submission Points 102 may take on a wide variety of application-specific designs to suit the needs of particular brokerages, investors, investment plans and the like. It is also contemplated that the electronic trading system 100 may contain multiple Validators 103, Match Engines 104, Persist components 105, Ticker Plants 106, Market Data Servers 107, and Market Data Distribution Servers 108. The routing of messages between these components 103 to 108 may be managed with commercially available hardware and software. It is understood that descriptions are given in the singular only to simplify the exposition. It is further understood that the term "order" and "new order" may also refer to any data communicated to the trading system that can affect the properties of a previously communicated order, including, but not limited to, modification of its price, modification of its volume or its cancelation or replacement by a different order, or a combination thereof.

The Order Submission Point 102 communicates with the Validator 103. The Validator 103 checks the properties of the new order against established criteria and communicates the validated order to the relevant Match Engine 104, if more than one is provided (not shown). In FIG. 1, it is assumed that the new order did not match any previously entered orders or their implied derivatives, so the Match Engine 104 communicates the unmatched received order to the Persist component 105, which stores the order, sometimes referred to as a "resting order," in its database 112, the accumulation of related orders in this database 112 sometimes being referred to as an "order book" or a "market." In FIG. 1, it is also assumed that the storage of the order by the Persist component 105 constitutes its "official" reception by the trading system, so the Persist component 105 communicates an execution report to the Order Submission Point 102, from which it is communicated to the originator of the order. The Persist component 105 may be implemented as part (such as software or firmware) of the match engine 104. Alternatively, the Persist component 105 may be a database, a memory, or another storage element, such as the memory 404 described with respect to FIG. 4. Additionally, the Persist component 105 may be computer hardware including a processor and a storage element, such as the processor 402 and memory 404 described below with respect to FIG. 4.

The Match Engine 104 also communicates the existence of the new order and any implied orders that it created, described in more detail below, to the Ticker Plant 106 (reporting device) which in turn, communicates the new order and implied orders to the Market Data Server 107. The Ticker Plant 106 (reporting device) occupies this position between the Match Engine 104 and the Market Data Server 107 and functions to aggregate data from multiple sources and communicates with components outside the electronic trading system 100, such as the Price Reporting System 110. The Ticker Plant 106 (reporting device) may be implemented as an integrated component of the Match Engine 104. Alternatively, the Ticker Plant 106 may be computer software, firmware, or hardware, that is separate but in communication with the Match Engine 104 (as shown). The Ticker plant 106 may store all or part of the data it receives in Ticker Plant Database 113 coupled therewith. The Market Data Server 107 may communicate market data to the client 109 in a variety of ways. For example, the market data may be sent to the Order Submission Point 102 for communication with the client over the same link as the execution report or sent to a Market Data Distribution Server 108 that can communicate with any number of clients (not shown).

Those of skill in the art will appreciate that the operations of the Match Engine 104 may be performed in more than one part of trading system 100 or in related systems. For example, the calculation of implied orders and/or identification of implied opportunities may be done by traders at their trading stations (not shown) in search of arbitrage opportunities between trading networks or match engines. It is also possible to perform these calculations outside the trading system 100 for the evaluation of possible trading strategies, for instruction, regulation or in the solution of other problems where trading is used as a model.

Figure 2:
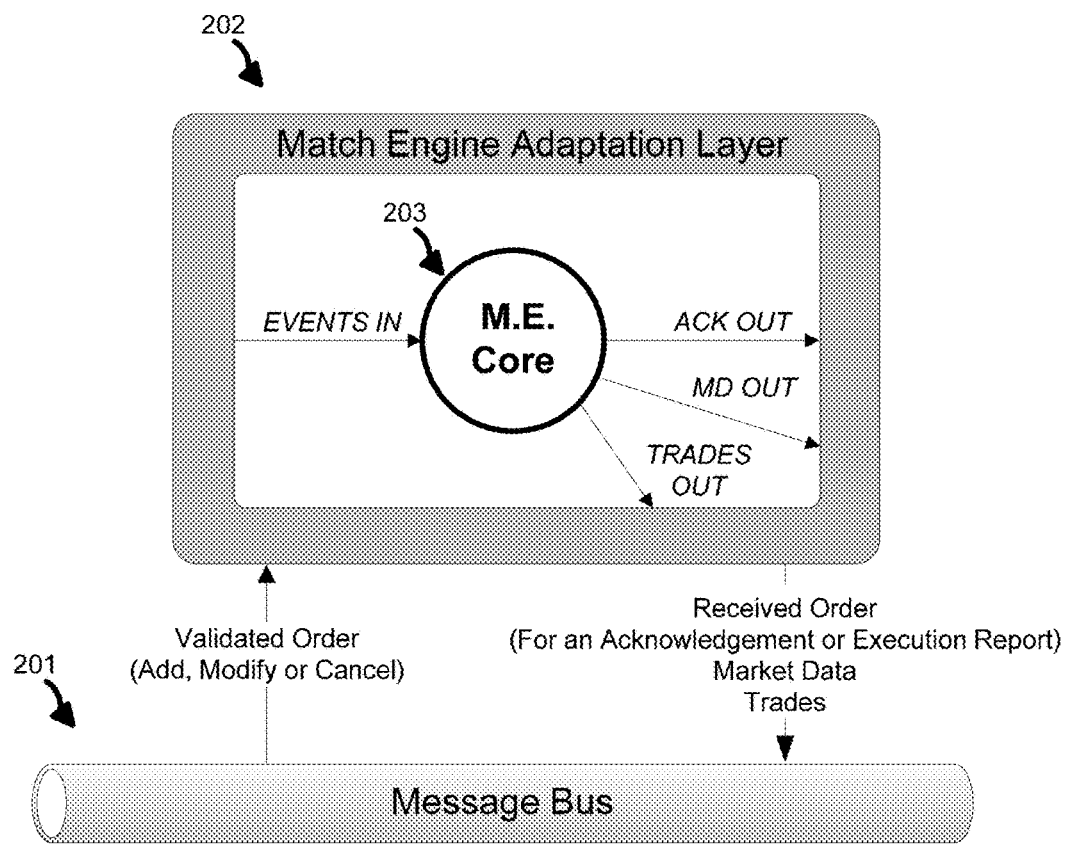
FIG. 2 illustrates an exemplary match engine architecture according to one embodiment.

FIG. 2 shows a more detailed block diagram of the Match Engine 104 of FIG. 1 having a layered architecture and embodied on a computer including a processor and a memory, such as the compute 400 having a processor 402 and memory 404, as described below with respect to FIG. 4. The Match Engine 104 may communicate with other components using a message bus 201. Incoming messages are translated by an Adaptation Layer 202 into events that can be processed by a Match Engine Core 203, sometimes referred to simply as the Core 203. The output messages from the Core 203 are translated by the Adaptation Layer 202 back into messages that can be transmitted to other parts of the trading system 100 using the message bus 201. The Core 203 identifies implied opportunities and calculates implied orders and may be implemented in hardware, software, or a combination thereof. In one embodiment, the Core 203 is implemented in software which is referred to as the Implicator or Match Engine Implicator (not shown). Although this example includes the Implicator as part of Match Engine 104 in an electronic trading system 100, the Implicator can be used in any system where implied opportunities need to be identified and/or implied orders need to be calculated. An example of such a system is the client software used by a trader to receive market data and search for arbitrage opportunities on multiple electronic trading systems.

A Match Engine Core 203 and its Implicator may be implemented in a programming language such as Java or C++ that allows multiple threads of execution and that a program with multiple threads may be executed on a computing system with multiple central processing units (CPU). In such an implementation, if the program is correctly designed, the threads may execute substantially in parallel and the time taken to execute all of the threads can be as short as the time taken by the single longest thread. If there are more threads than CPUs, then the execution time will depend on how many threads must be executed sequentially on each CPU. In FIG. 2, it is contemplated that the Core 203 will be implemented in such a language and that the calculation of implied orders by the Implicator will be accelerated by performing many independent calculations in parallel on separate threads.

An Implicator operates on a group of contracts referred to as an implication group. In futures trading, an implication group consists of orders for outright contracts and combination contracts that can trade with each other. An outright contract is defined by at least a product and a delivery period, such as West Texas Intermediate Crude Oil delivered at Cushing, Okla. in the month of January 2008. A combination contract, also referred to as a strategy, may be defined as a combination of orders for outright contracts where each order for an outright contract forms a leg of the strategy. The definition specifies whether buying a unit quantity of the strategy, i.e. the combination contract, requires a given leg to be bought or sold and in what quantity. Strategies may be defined by the exchange and advertised to traders as tradable instruments. Strategies may also be defined by users through a security definition request conveyed to the trading system using an appropriate protocol, as will be described in more detail below.

A simple combination contract found in many futures trading systems is the calendar spread, which is a contract to buy a product in one delivery period and sell it in another. An exemplary implication group would be the outright contracts for a given product in two different delivery periods and the calendar spread contract between these two outright contracts.

It is possible to define combination contracts with any number of legs. Further examples of combination contracts include the intercommodity spread with two legs, the 3:2:1 ratio spread with three legs and the yearly strip with twelve legs. Any number of such contracts may be placed in an implication group so long as any combination contract that belongs to the group also has all of its outright leg contracts as members of the group. It is not necessary for every possible combination of the outright contracts to correspond to a tradable combination contract.

It is possible to define combination contracts where the purchase of a single unit of the combination requires the purchase or sale of any number of units in the legs. The number of units required of any given leg is referred to as its volume ratio. Examples of strategies that include legs having different volume ratios include, but are not limited to, the butterfly, the double butterfly, crack spreads, crush spreads, and other ratio spreads, which are discussed in detail below.

It is possible to extend the foregoing definitions to tradable items other than commodity futures, such as equities, options on equities, options on futures and other tradable instruments.

An exemplary combination contract is the butterfly, which consists of three legs referred to as the wing, the body and the (second) wing. A futures butterfly is typically defined with the wing, the body and the second wing in three successive delivery periods. A futures butterfly definition may be expressed using trading terminology as Buy1exp1 Sell2exp2 Buy1exp3. The double position in the middle is called the body, while the two other positions are called the wings.

The options butterfly, which is an often used as an example because of its common use in volatility trading, is defined with the wing, the body and the second wing as options in the same product and delivery period but with different strike prices. The buy butterfly (long butterfly) call options spread includes a long call at a low strike price, (a long 1 call at (X−a) strike), a long call at a high strike price (long 1 call at (X+a) strike), and a short with twice the unit volume at the average strike price (short 2 calls at X strike). Buy butterfly spreads may also be formed with put options and may also be unbalanced, using different strike prices. A sell butterfly (short butterfly) takes the opposite position.

The double butterfly, also known as the double butterfly spread, is a combination defined as a spread between two simple butterflies, i.e. one butterfly is bought and the other sold. A double butterfly futures spread may be equally defined as a combination of legs at four different delivery periods (expiry dates), which may be expressed as "buy1exp1 sell3exp2 buy3exp3 sell1exp4". For a double butterfly options spread the legs are at four different strike prices instead of different delivery periods.

The crack spread involves a ratio of crude oil to a distillate such as gasoline or heating oil. Simple crack spreads involve only crude oil and a single distillate. However, crack spreads may also be defined in two-one-one, three-two-one, or five-three-two ratios of crude oil and two of its distillates.

A crush spread involves soybeans or other commodity and the products that can be made from the commodity, such as oil from soybeans. A crush spread may be made at any ratio.

The crack spread and crush spread are specific examples of ratio spreads. A ratio spread is any strategy that involves buying some number of tradable instruments and selling a different number of other tradable instruments. The tradable instruments may have some common property and the ratio may be based on some relationship between the physical or financial products that the tradable instruments represent, but this is not required. For example, a ratio spread can be formed using options of the same underlying market (or another market) and (usually) the same expiration date, but of a different strike price. However, this is just an example and ratio spreads may in principle be constructed with any combination of contracts and volume ratios in any number of buy and sell legs.

The disclosed embodiments may further be applicable to currency spreads, also referred to as currency swaps or foreign exchange swaps, where orders for such swaps may result in implied orders as described herein. For example, orders for a dollar-yen swap and a Franc-Euro swap may imply an appropriate order for a dollar-Euro swap.

Examples of techniques for defining implicable contracts and calculating the implied orders or identifying the implied opportunities that can trade in such contracts can be found in: U.S. patent application Ser. No. 12/032,379, entitled "Symbolic Language For Trade Matching" and published as US Patent Application Publication No. 2009/0327153 A1; U.S. Pat. No. 7,039,610 B2, entitled "IMPLIED MARKET TRADING SYSTEM"; U.S. Pat. No. 7,805,360 B2, entitled "TEMPLATE BASED MATCHING"; and U.S. patent application Ser. No. 12/559,215, entitled "RULE BASED VECTOR SPACE MODEL FOR CREATING IMPLIED TRADE TEMPLATES" an published as U.S. Patent Application Publication No. 2011/0066567 A1; which are all incorporated herein by reference in its entirety. The match engine modeling language (MEML) and implication techniques described in U.S. patent application Ser. No. 12/032,379 make use of graph theory, which is the study of mathematical structures used to model pairwise relations between objects from a certain collection. A "graph" in this context refers to a collection of vertices or "nodes" and a collection of "edges" that connect pairs of vertices. The type of graph used in the technique is sometimes referred to more specifically as a "directed graph," since each edge is defined with a source node and a target node and is directed from the source to the target.

In one implementation, the Match Engine 104 is a computing device operating under the control of a computer program, wherein the computer program implements a specification expressed in the match engine modeling language. As contemplated by U.S. patent application Ser. No. 12/032,379, the modeling language includes a concrete syntax, an abstract syntax for constructing expressions in the language, a syntactic mapping for associating MEML expressions with elements of the trading system 100 and a semantic mapping to relate modeling language expressions to real-world business requirements.

An example of a technique for rapidly calculating implied orders is given in U.S. patent application Ser. No. 12/350,788, entitled "Determination of Implied Orders in a Trade Matching System" and published as U.S. Patent Application Publication No. 2010/0174633 A1, which is incorporated herein in its entirety. A match engine that implements a specification expressed in the match engine modeling language contemplated by U.S. patent application Ser. No. 12/032,379 may have its speed of calculation increased thereby.

Those of skill in the art will appreciate that once a method has been given for expressing a tradable combination of contracts in the match engine modeling language contemplated by U.S. patent application Ser. No. 12/032,379, a match engine specified in that modeling language can be readily extended to perform the computations required to imply any component order in that combination using the techniques associated with finding shortest paths in a graph.

Methods used to accelerate the calculation of implied orders, such as the categorization, analysis, allocation, filtering, thread management and merging techniques contemplated by U.S. patent application Ser. No. 12/350,788 do not depend on the specific form of shortest path calculation so long as there is a means of assigning shortest path trees or similar groups of data to independent threads.

There may be many well-known methods available for calculating shortest paths including, without limitation: Floyd's algorithm, the Bellman-Ford algorithm, Dijkstra's algorithm, and Johnson's algorithm. Similarly, the calculation of other graph properties, including but not limited to the identification and removal of zero-priced or negatively priced cycles within a graph can be performed using straightforward extensions of these algorithms or with other known algorithms.

Other methods of identifying implied opportunities include using trade templates, as discussed in U.S. Pat. No. 7,805360. A trade template is a pre-defined combination of exemplary instruments which can trade together. Using a trade template, the match engine core 203 may seek resting instruments fulfilling the template requirements knowing that, if found, a tradeable combination has been identified. Typically, when an order is received, the match engine core 203 determines which trade templates include the particular instrument type that is the subject of the received order. For each template that is identified, the match engine core 203, based on the other instruments contemplated by the template, attempts to identify resting orders in the requisite markets which would complete the combination and render the received order and the identified resting orders tradeable, as contemplated by the trade template. It will be appreciated that there may be numerous templates for different combinations (chosen for market liquidity reasons, etc.)

Generally, some implied opportunity identification mechanisms are activated upon, or within a defined time subsequent to, the enablement of trading to scan the resting order books for resting order combinations which satisfy implied relationships and/or to await receipt of a real order from a trader and, based thereon, determine whether implied opportunities exist among the received order and existing resting orders in other markets which may be executed in conjunction with the received order. It will be appreciated that the arriving order may be first tested to determine whether there is a resting matching counter order in its respective market, or alternatively, where such a counter order exists, the system may determine whether an available implied opportunity or the counter order has the better price and match the arriving order based thereon. If no counter orders and no implied opportunities exist, the incoming order is listed, i.e. becomes a resting order, in its respective market. Identifying implied opportunities upon receipt of an order is more efficient than trying to analyze existing resting orders for implied opportunities because, as described above, the large number of potential combinations which would need to be evaluated. In some cases, the received order allows the resting orders to be satisfied at a price better than the price sought by the traders of those orders. This is referred to as a "price improvement" and the benefit is typically automatically assigned by the trading system to one or more of participating traders, typically in an equitable fashion.

Under conditions when orders are allowed to be submitted but not matched, such as when implied trading is suspended, such as due to a stop spike, circuit breaker or price limits, etc., or when a trading system is operating a "pre-open" phase whereby the submission of orders prior to the opening of the markets is used to gauge opening prices, implied order computation and implied opportunity identification mechanisms are typically turned off since order matching/execution is not permitted. In this case, as orders are received, they are placed on their respective order books to rest. Accordingly, orders which may comprise an implied relationship, may be received, but not matched because the implied opportunity is not recognized. These orders are instead placed on the respective order books to rest. When orders which comprise an implied relationship are not matched but are, instead, listed in their respective order books, implied crossed books may occur whereby a given order which may match against orders resting on other books, is resting at a better price than is sought by the other orders. While it may be possible to have an order book wherein the orders resting on that book are crossed, herein a crossed book, also referred to as an implied crossed book, refers to the relationship among orders resting on multiple order books. Herein, the term "better price" is relative to the type of order, also referred to as the "side" of the trade, and may mean, for a sell/ask order, that the seller may receive more than they asked for, or for a buy/bid order, that the buyer may pay less than they offered, wherein the benefit received is referred to as a "price improvement," as was described above. In a live market, a crossed book would not occur as the respective orders would have been identified and matched via the identification of an implied opportunity with the price improvement being allocated to one or more of the participating traders via pre-defined rules, such as allocating the price improvement to the arriving order which made the implied trade possible.

Upon the enablement of trading, or shortly thereafter, e.g. 0 to 30 seconds, present implied opportunity mechanisms may scan or otherwise analyze the resting order books, as was described above, to identify crossed order books for implied opportunities, however, a fair allocation of the resulting price improvement may be difficult to implement as the orders resting in the order books, representing a state of the market for the respective instrument, are not typically classified by their arrival order. As noted above, a price improvement is the difference between the buying and selling prices of the matched orders so it must be determined if one party should benefit over the other party or not, and the extent to which the benefit may be allocated among the parties. Once the resting order books have been scanned and any resting implied opportunities recognized, in active trading, current implied opportunity mechanisms typically accord the benefit to the arriving order, particularly to avoid trade through's, described in more detail below. In other implementations, during active trading, the benefit may be accorded to the order for the instrument, which is the least liquid, thereby encouraging trading in that instrument and improving liquidity.

However, once a particular implied crossed book order combination is resting, subsequent enablement of matching and implied opportunity identification may result in a "side effect" or aberration known as a "trade through" whereby inspection of the resting orders in the order books subsequent to enablement of trading triggers the implied opportunity identification mechanism causing a match among the resting orders and an assignment of the price improvement resulting therefrom which, but for the identification of the implied opportunity, would have been resolved by the profit seeking activity of the traders had trading been previously enabled. In the market for the order which received the price improvement, i.e. its price is effectively improved, traders will see what appears to be out-of-order matching, i.e., an order at an equivalent or worse price will appear to have been matched before another order at an equivalent or better price. This may cause market confusion.

The disclosed embodiments recognize that implied crossed books caused by acceptance of orders when matching is suspended represent arbitrage opportunities whereby savvy traders may profit by placing real orders in an effort to secure the price discrepancy between the orders which make up the unrecognized implied opportunity, e.g., the outrights and the spread market. Therefore, the disclosed embodiments generally eliminate the inspection of the resting order books looking for resting implied opportunities and delay activation of implied opportunity identification based on arriving orders, as opposed to activation substantially contemporaneously with enablement of trade matching and execution. This allows market forces to resolve any such crossed books and reduces the computational load on the match engine core 203 by eliminating the need to scan the resting order books.

In particular, subsequent to the enablement of trade matching or other event, such as when the market opens or trading resumes after a suspension, the disclosed embodiments, upon receipt of an order, determine whether an implied opportunity is present based on the received order and, if so, whether the relevant markets for associated instruments are crossed. If implied crossed markets are detected, activation of implied opportunity identification is delayed and the received order is instead listed on the appropriate order book as a resting order. It will be appreciated that the received order may be matched with a resting directly counter-order, if available, either subsequent to implied crossed market determination or prior thereto, depending upon the implementation. In this manner, traders are afforded the opportunity to gain from the arbitrage opportunity available due to the crossed order books and place orders which should result in the uncrossing of the relevant markets. In one embodiment, if market forces fail to resolve particular crossed order books within a defined period of time, implied opportunity identification may be enabled regardless, allowing the next valid received order to be matched.

By selectively enabling implied opportunity identification as orders are received only in cases where the received order may satisfy implied opportunities in uncrossed markets, i.e. there is no price improvement available—the received order is either rested when the prices are not good enough or matched when the prices are equal, the disclosed embodiments further reduce the computational load on the match engine core 203 by minimizing the number of implied opportunities that need to be calculated and matched for each received order.

Herein, the phrase "coupled with" is defined to mean directly connected to or indirectly connected through one or more intermediate components. Such intermediate components may include both hardware- and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 4:
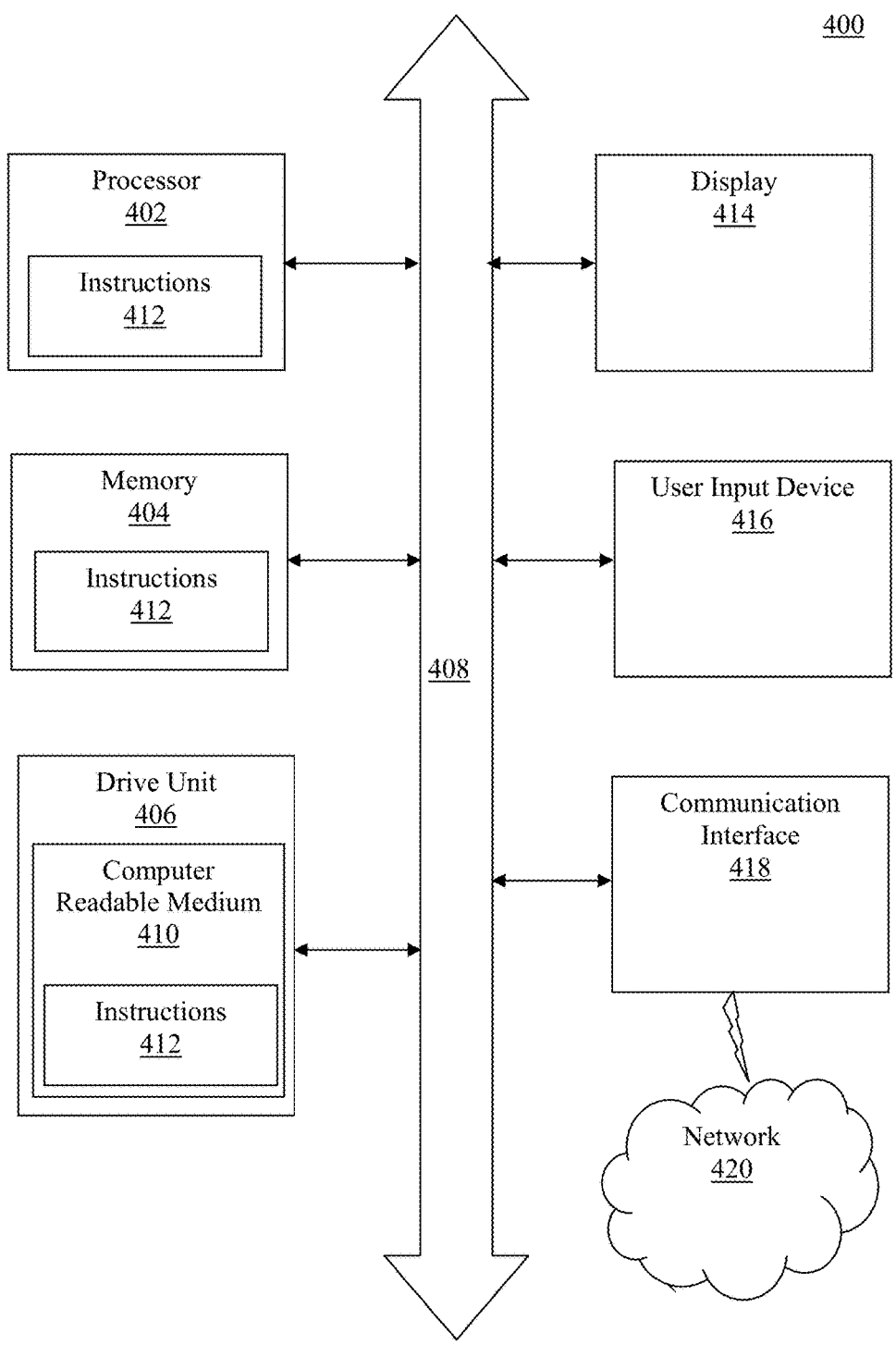
FIG. 4 shows an illustrative embodiment of a general computer system for use with the system of FIG. 1.
Figure 5:
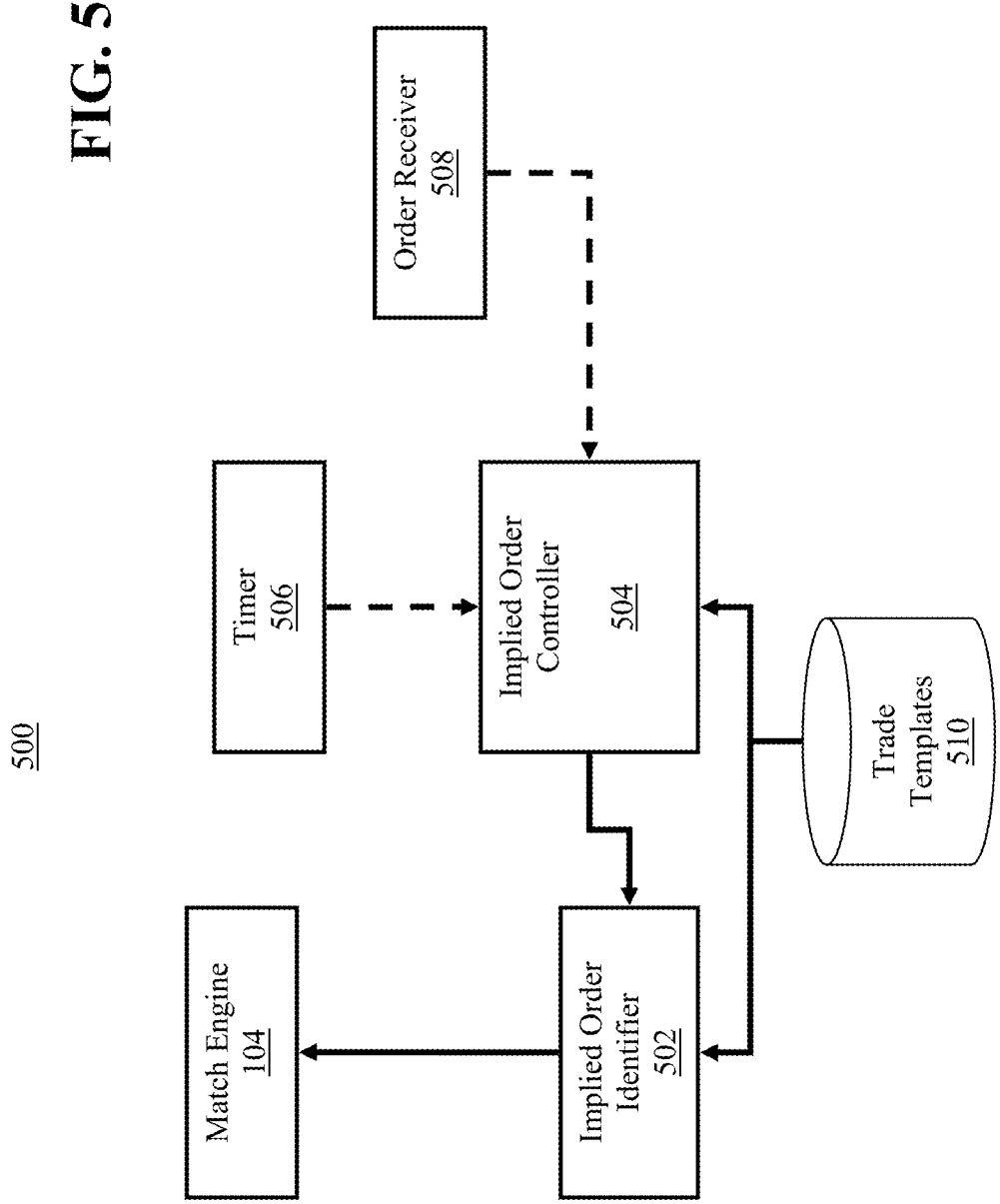
FIG. 5 shows a block diagram depicting one embodiment of a system for improving the efficiency of a trading system.

FIG. 5 shows a block diagram depicting one embodiment of a system 500 for improving the efficiency of a trading system 100, or match engine 104 therefore which is operative to match an order for an instrument with another order counter thereto to at least partially satisfy one or both of the order or the other order. Generally, the disclosed embodiments improve efficiency of the trading system 100, or match engine 104, by delaying identification, to the match engine, of an order implied by a plurality of resting orders, each resting in a different market, when an opportunity exists to arbitrage among the plurality of resting orders, i.e. when there is an advantageous price discrepancy among the plurality of resting orders. The system 500 includes an implied opportunity identifier 502 and further includes an implied opportunity controller 504 coupled therewith. In one embodiment the system 500 may be implemented as part of the trading system 100 or, alternatively, as an external component thereto. The system 500 may further be implemented as part of, or using, the computer 400 described with respect to FIG. 4. For example, the system 500 and/or the implied opportunity identifier 502 and implied opportunity controller 504 may be implemented as computer logic stored in the memory 404 or computer-readable medium 410 and executable by the processor 402 to operate as described herein.

In one embodiment, the implied opportunity controller 504 is operative to disable identification, by the implied opportunity identifier 502, to the match engine 104, a first set of orders, each order of the first set of orders being for a different instrument at an associated order price, i.e. not directly counter to any one order of the other orders in the first set of orders, wherein if identified to the match engine 104, one or more of the orders of the first set of orders would be used by the match engine 104 to at least partially satisfy, at an associated match price, the remaining orders of the first set of orders. The match price is the theoretical or hypothetical price that the orders would be matched at and may be the same as or different from the order price of the respective orders. The implied opportunity controller 504 may disable the identification in response to the close of markets for any of the instruments associated with the first set of orders. Alternatively, or in addition thereto, the implied opportunity controller 504 may disable identification in response to a market event, such as a price exceeding a threshold, in a market for any of the instruments associated with the first set of orders.

The implied opportunity controller 504 is further operative to determine, subsequent to the receipt of all of the orders of the first set of orders, that an event has occurred and, based thereon further determine whether the associated match price for any order of the first set of orders would be better than the associated order price thereof, and enable, when the associated match price for each order of the first set of orders would not be better than the associated order price thereof, identification by the implied opportunity identifier 502 to the match engine 104, upon receipt of a subsequent order for a same instrument associated with any of the orders of the first set of orders, of a second set of orders comprising the subsequent order and a subset of orders of the first set of orders wherein, if identified to the match engine 104, one or more of the orders of the second set of orders would be used by the match engine 104 to at least partially satisfy the remaining orders of the second set of orders.

In one embodiment, the implied opportunity identifier 502 is further operative to provide a plurality of exemplary order combinations, each exemplary order combination comprising, or otherwise defining or specifying in whole or in part, a plurality of exemplar orders, i.e. each may be a definition or specification of one or more order characteristics or other parameters which may characterize a real order, each exemplar order of an exemplary order combination being for, or otherwise specifying, one or more instruments, wherein one or more of the exemplar orders, i.e. real orders defined thereby, of the exemplary order combination, if actually received, could be used by the match engine 104 to at least partially satisfy each of the remaining exemplar orders, i.e. real orders defined thereby, of the exemplary order combination, if actually received. In one embodiment, each exemplary order combination is trade template, described in more detail above, and may be stored in a database 510 coupled with the implied opportunity identifier 502 and implied opportunity controller 504. Each of the plurality of order combinations, e.g. trade templates, further enables the implied opportunity controller 504 to identify the second set of orders as being capable of being identified to the match engine 104 such that one or more of the orders of the second set of orders would be used by the match engine 104 to at least partially satisfy the remaining orders of the second set of orders. Accordingly, the first and second sets of orders may be representative of, i.e. defined or specified by, one of the plurality of exemplary order combinations.

In one embodiment, the implied opportunity controller 504 is further operative to, upon receipt of the subsequent order, determine a subset of the exemplary order combinations comprising an exemplar order similar, i.e. meeting the specification or definition thereof, to the subsequent order. The implied opportunity controller 504 may then be further operative to not enable order combinations which do not include an exemplar order similar to the subsequent order. In this way, implied order combinations, e.g. trade templates, are not activate all at once, which conserves system resources by not requiring calculation and matching of implied orders all at once.

In particular, in one embodiment, the implied opportunity controller 504 is further operative to disable identification by the implied opportunity identifier 502 to the match engine 104, a third set of orders, each order of the third set of orders being for a different instrument at an associated order price and not counter to any one order of the other orders of the third set of orders, wherein if identified to the match engine 104, one or more of the orders of the third set of orders would be used by the match engine 104 to at least partially satisfy, at an associated match price, the remaining orders of the third set of orders. The implied opportunity controller 504 is further operative to not enable, when the associated match price for each order of the first set of orders would not be better than the associated order price thereof, identification by the implied opportunity identifier 502 to the match engine 104, upon receipt of another subsequent order for a same instrument associated with any of the orders of the third set of orders, of a fourth set of orders comprising the other subsequent order and a subset of orders of the third set of orders wherein, if identified to the match engine 104, one or more of the orders of the fourth set of orders would be used by the match engine 104 to at least partially satisfy the remaining orders of the fourth set of orders.

As was discussed above, where one of the orders if the first set of orders comprising a buy order, the match price of thereof may be better than the order price thereof when the match price thereof is less than the order price thereof. Further, where one of the orders of the first set of orders comprising a sell order, the match price of thereof may be better than the order price thereof when the match price thereof is greater than the order price thereof. It will be appreciated that the definition of a better price may be implementation dependent and further depend on the type of instrument being traded, the nature of the order therefore and the context of the market, therefore. However, one of ordinary skill in the art would understand when one price is better than another in a given trading scenario.

In one embodiment, one of the instruments associated with an order of the first set of orders may be a spread between instruments associated with the remaining of the orders of the first set of orders.

In one embodiment, the event may include receipt of the subsequent order. Further, the implied opportunity controller 504 may be further operative to enable the identification by the implied opportunity identifier 502 of the first set of orders to the match engine 104 when the event has not occurred, e.g., the subsequent order has not been received, within a defined period of time. Alternatively, or in addition thereto, the event may be an expiration of a timer 506. Further, the implied opportunity controller 504 may be further operative to enable the identification by the implied opportunity identifier 502 of the second set of orders to the match engine 104 when the timer 506 expires or when the associated match price for each order of the first set of orders would not be better than the associated order price thereof. It will be appreciated that any event may trigger the implied opportunity controller 504 to evaluate implied markets for crossed books and enable implied opportunity identification by the implied opportunity identifier based thereon. For example, the event may be the opening of markets for one or more of the instruments associated with the first set of orders. However, where market forces fail to resolve the crossed books in a timely manner, mechanisms may be provided to allow the implied opportunity identifier 502 to identify the implied opportunity to the match engine 104 despite that a trade through may occur. Other events which may trigger the determination as to whether an implied crossed market exists and/or whether subsequently received order creates an implied opportunity include a determination of low liquidity, e.g. liquidity determined to be below a defined threshold value, in a particular market, a determination that a particular order has an associated risk which exceeds a defined threshold, a determination that a spread between the best bid and ask orders in a given market has exceeded a defined threshold, a determination that particular orders would require fees which exceeds a defined threshold (which may be defined based on the anticipated profit to be gained from the orders), or simply based on the random, or pseudo-random, selection of an instrument or combination of instruments for which implied opportunity should be enabled, or a combination thereof. Generally, the triggering event may coincide with, or be defined by, instruments or combinations of instruments, for which it would be advantageous, for traders and/or the Exchange, to enable implied opportunity identification. For example, in situations where it is beneficial to attract traders to place orders they would not otherwise place.

In one embodiment, the system 500 may further include an order receiver 508 coupled with the implied order identifier 502 and implied order controller 504 and operative to receive each of the orders of the first set of orders and list, subsequent thereto, each of the received orders in an order book for the instrument associated therewith, and list, when any of the associated match price for each order of the first set of orders would be better than the associated order price thereof, the subsequent order in the order book for the instrument associated therewith.

Figure 3:
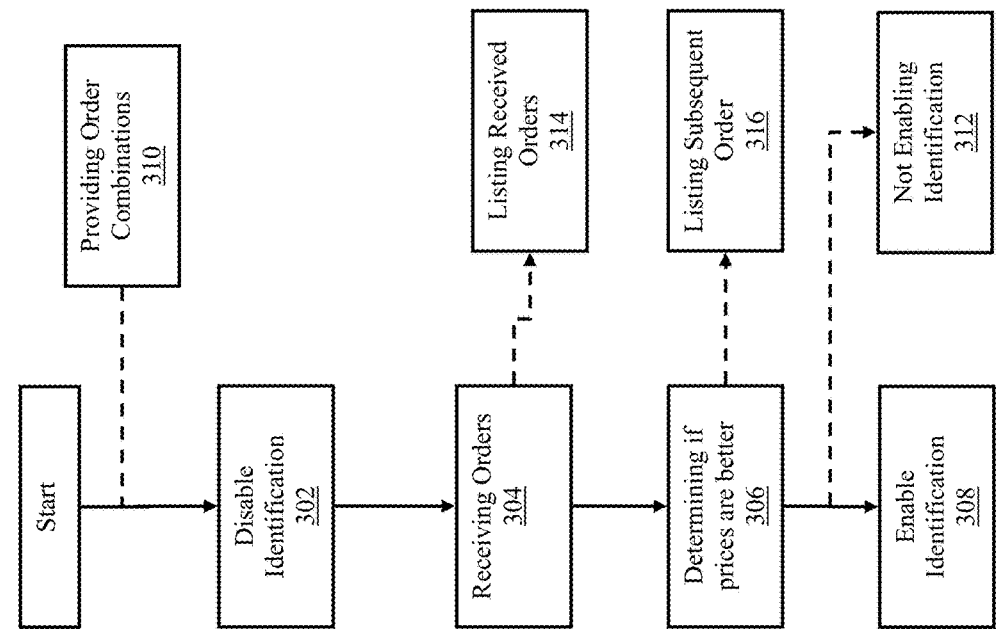
FIG. 3 depicts a flow chart depicting operation of the system of FIG. 5 for improving the efficiency of a trading system according to one embodiment.

FIG. 3 depicts a flow chart depicting operation of the system of FIG. 5 for improving the efficiency of a trading system according to one embodiment. In particular, FIG. 3 shows a computer implemented method for improving efficiency of a trading system 100, the trading system comprising a processor 400 and a match engine 104 coupled therewith operative to match an order for an instrument with another order counter thereto to at least partially satisfy one or both of the order or the other order.

The method includes disabling, by the processor 400, the processor 400 from identifying to the match engine 104, a first set of orders, each order of the first set of orders being for a different instrument at an associated order price, i.e. not directly counter to any one order of the other orders in the first set of orders, wherein if identified to the match engine 104, one or more of the orders of the first set of orders would be used by the match engine 104 to at least partially satisfy, at an associated match price, the remaining orders of the first set of orders (block 302). In one embodiment, the disabling may further include disabling in response to the close of markets for any of the instruments associated with the first set of orders and/or in response to a market event in a market for any of the instruments associated with the first set of orders.

The method further includes: receiving, by the processor 400, each order of the first set of orders (block 304); and determining, by the processor 400 subsequent to the receiving of all of the orders of the first set of orders, that an event, such as a price exceeding a threshold, has occurred and, based thereon further determining by the processor 400 whether the associated match price for any order of the first set of orders would be better than the associated order price thereof (block 306).

In addition, the method includes enabling, by the processor 400 when the associated match price for each order of the first set of orders would not be better than the associated order price thereof, identification to the match engine 104, upon receipt of a subsequent order for a same instrument associated with any of the orders of the first set of orders, of a second set of orders comprising the subsequent order and a subset of orders of the first set of orders wherein, if identified to the match engine 104, one or more of the orders of the second set of orders would be used by the match engine 104 to at least partially satisfy the remaining orders of the second set of orders (block 308).

In one embodiment, the method further includes providing a plurality of exemplary order combinations, each exemplary order combination comprising, or otherwise defining or specifying in whole in part, a plurality of exemplar orders, each exemplar order of an exemplary order combination being for one or more instruments, wherein one or more of the exemplar orders of the exemplary order combination, if actually received, could be used by the match engine 104 to at least partially satisfy each of the remaining exemplar orders of the exemplary order combination, if actually received (block 310). Wherein each of the plurality of order combinations further enables the processor 400 to identify the second set of orders as being capable of being identified to the match engine 104 such that one or more of the orders of the second set of orders would be used by the match engine 104 to at least partially satisfy the remaining orders of the second set of orders. Further wherein the first and second sets of orders comprise one of the plurality of exemplary order combinations. In one embodiment, the identification upon receipt of the subsequent order further may further include determining a subset of the exemplary order combinations comprising an exemplar order similar to the subsequent order.

In one embodiment, the enabling may further include not enabling order combinations which do not include an exemplar order similar to the subsequent order.

In one embodiment, the method further includes: disabling, by the processor 400, the processor 400 from identifying to a match engine 104, a third set of orders, each order of the third set of orders being for a different instrument at an associated order price and not counter to any one order of the other orders of the third set of orders, wherein if identified to the match engine 104, one or more of the orders of the third set of orders would be used by the match engine 104 to at least partially satisfy, at an associated match price, the remaining orders of the third set of orders; receiving, by the processor 400, each order of the third set of orders; and wherein the enabling, by the processor 400 when the associated match price for each order of the first set of orders would not be better than the associated order price thereof, further comprises not enabling identification to the match engine 104, upon receipt of another subsequent order for a same instrument associated with any of the orders of the third set of orders, of a fourth set of orders comprising the other subsequent order and a subset of orders of the third set of orders wherein, if identified to the match engine 104, one or more of the orders of the fourth set of orders would be used by the match engine 104 to at least partially satisfy the remaining orders of the fourth set of orders (block 312).

As discussed above, where one of the orders if the first set of orders comprising a buy order, the match price of thereof may be better than the order price thereof when the match price thereof is less than the order price thereof and where one of the orders if the first set of orders comprising a sell order, the match price of thereof may be better than the order price thereof when the match price thereof is greater than the order price thereof.

In one embodiment, one of the instruments associated with an order of the first set of orders may be a spread between instruments associated with the remaining of the orders of the first set of orders.

In one embodiment, wherein the event may include receipt of the subsequent order, the enabling may further include enabling the identification of the first set of orders to the match engine 104 when the event has not occurred, e.g., the subsequent order has not been received, within a defined period of time. Alternatively, or in addition thereto, the event may be an expiration of a timer 506, where the enabling may further include enabling the identification of the second set of orders to the match engine 104 when the timer expires or when the associated match price for each order of the first set of orders would not be better than the associated order price thereof. Alternatively, or in addition thereto, the event may be the opening of markets for one or more of the instruments associated with the first set of orders.

In one embodiment, the method further includes: listing, by the processor subsequent to the receiving of each of the orders of the first set of orders, each of the received orders in an order book for the instrument associated therewith (block 314); and listing, by the processor, when any of the associated match price for each order of the first set of orders would be better than the associated order price thereof, the subsequent order in the order book for the instrument associated therewith (block 316).

It will be appreciated that subsequent to the disablement of implied opportunity identification, such as due to the close of the markets or another interruption to or suspension of matching, as described above, the determination of crossed books on an order by order basis as orders are received, and enablement of implied opportunity identification of only those markets associate with the received order, may continue as new orders are received, or other events as described above occur, until such time as all possible implied opportunities have been enabled or identification is again disabled. As such, during any given trading day, not all possible implied opportunities will be enabled for identification and matching.

Generally, inspecting order books for resting orders which may present implied opportunities and further allowing implied order identification across all possible implied order combinations at once is computationally intensive. Accordingly, as described, the disclosed embodiments eliminate the inspection of order books upon enablement of trading and activate the identification of particular implied opportunities based on determining that the associated order books are not crossed and, in some embodiments, based on other events. In this way, not only are crossed books allowed to resolve naturally via market forces, thereby avoiding trade throughs when implied orders are activated, but processing load on the match engine and related components is, at least initially, reduced by restricting the number of requisite calculations for implied orders and, instead, gradually ramping up such computations over time.

Referring to FIG. 4, an illustrative embodiment of a general computer system 400 is shown. The computer system 400 can include a set of instructions that can be executed to cause the computer system 400 to perform any one or more of the methods or computer-based functions disclosed herein. The computer system 400 may operate as a standalone device or may be connected, e.g., using a network, to other computer systems or peripheral devices. Any of the components discussed above, such as the match engine 104, implied opportunity identifier 502 or implied opportunity controller 504, may be a computer system 400 or a component in the computer system 400. The computer system 400 may implement a match engine 104 on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine In a particular embodiment, the computer system 400 can be implemented using electronic devices that provide voice, video, or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random-access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control, or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images, or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical discs, or optical discs. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical discs; and CD ROM and DVD-ROM discs. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented system for improving efficiency of a trading system, the trading system comprising a processor and a match engine coupled therewith, the match engine being operative to match an order for an instrument with another order counter thereto to at least partially satisfy one or both of the order or the other order, the system comprising:

computer executable program codes stored in a non-transitory memory and executable by a processor coupled therewith to cause the processor to:
disable, selectively by the processor, the processor from identifying to the match engine, a first set of orders, each order of the first set of orders being for a different instrument at an associated order price, wherein if identified to the match engine, one or more of the orders of the first set of orders would be used by the match engine to at least partially satisfy, at an associated match price, the remaining orders of the first set of orders;
receive, by the processor, each order of the first set of orders;
determine, by the processor subsequent to the receiving of all of the orders of the first set of orders, that an event has occurred and, based thereon further determining by the processor whether the associated match price for any order of the first set of orders would be better than the associated order price thereof; and
enable, selectively by the processor when the associated match price for each order of the first set of orders would not be better than the associated order price thereof, identification to the match engine, upon receipt of a subsequent order for a same instrument associated with any of the orders of the first set of orders, of a second set of orders comprising the subsequent order and a subset of orders of the first set of orders wherein, if identified to the match engine, one or more of the orders of the second set of orders would be used by the match engine to at least partially satisfy the remaining orders of the second set of orders; and the match engine, when disabled by the processor, being operative to process each order of first set of orders upon receipt thereof to match the received order of the first set of orders with another previously received order counter thereto for the same instrument as the received order to at least partially satisfy one or both of the order or the other order and generate data indicative thereof, and when enabled by the processor, being operative to process each order of the second set of orders upon receipt thereof to match, regardless of the instrument for which the order is for, the received order of the second set of orders with another previously received order counter thereto or with another order of the second set of orders to at least partially satisfy one or both of the order or the other order and generate data indicative thereof;

the computer executable program codes being further executable by the processor to cause the processor to generate and communicate data indicative of a result of the processing of each order of the first set of orders to a source thereof via a communications network coupled therewith; and wherein the match engine being unable to match an incoming order from the second set of orders with another order counter thereto from the second set of orders is avoided.

2. The computer implemented system of claim 1 wherein the computer executable code is further executable by the processor to cause the processor to:

provide a plurality of exemplary order combinations, each exemplary order combination comprising a plurality of exemplar orders, each exemplar order of an exemplary order combination being for one or more instruments, wherein one or more of the exemplar orders of the exemplary order combination, if actually received, could be used by the match engine to at least partially satisfy each of the remaining exemplar orders of the exemplary order combination, if actually received; and wherein each of the plurality of order combinations further enables the processor to identify the second set of orders as being capable of being identified to the match engine such that one or more of the orders of the second set of orders would be used by the match engine to at least partially satisfy the remaining orders of the second set of orders; and further wherein the first and second sets of orders comprise one of the plurality of exemplary order combinations.

3. The computer implemented system of claim 2 wherein the identification upon receipt of the subsequent order further comprises causing the processor to determine a subset of the exemplary order combinations comprising an exemplar order similar to the subsequent order.

4. The computer implemented system of claim 3 wherein the computer executable code is further operative to cause the process to not enable order combinations which do not include an exemplar order similar to the subsequent order.

5. The computer implemented system of claim 1 wherein the computer executable code is further executable by the processor to cause the processor to:

disable, by the processor, the processor from identifying to a match engine, a third set of orders, each order of the third set of orders being for a different instrument at an associated order price, wherein if identified to the match engine, one or more of the orders of the third set of orders would be used by the match engine to at least partially satisfy, at an associated match price, the remaining orders of the third set of orders;

receive, by the processor, each order of the third set of orders; and wherein the enabling, by the processor when the associated match price for each order of the first set of orders would not be better than the associated order price thereof, further comprises not enabling identification to the match engine, upon receipt of another subsequent order for a same instrument associated with any of the orders of the third set of orders, of a fourth set of orders comprising the other subsequent order and a subset of orders of the third set of orders wherein, if identified to the match engine, one or more of the orders of the fourth set of orders would be used by the match engine to at least partially satisfy the remaining orders of the fourth set of orders.

6. The computer implemented system of claim 1 wherein the computer executable code is further executable by the processor to cause the processor to disable in response to the close of markets for any of the instruments associated with the first set of orders.

7. The computer implemented system of claim 1 wherein the computer executable code is further executable by the processor to cause the processor to disable in response to a market event in a market for any of the instruments associated with the first set of orders.

8. The computer implemented system of claim 7 wherein the market event comprises a price exceeding a threshold.

9. The computer implemented system of claim 1 wherein one of the orders of the first set of orders comprises a buy order, the match price of thereof being better than the order price thereof when the match price thereof is less than the order price thereof.

10. The computer implemented system of claim 1 wherein one of the orders of the first set of orders comprises a sell order, the match price of thereof being better than the order price thereof when the match price thereof is greater than the order price thereof.

11. The computer implemented system of claim 1 wherein one of the instruments associated with an order of the first set of orders comprises a spread between instruments associated with the remaining of the orders of the first set of orders.

12. The computer implemented system of claim 1 wherein the event comprises receipt of the subsequent order.

13. The computer implemented system of claim 12 wherein the computer executable code is further executable by the processor to cause the processor to enable the identification of the first set of orders to the match engine when the subsequent order has not been received within a defined period of time.

14. The computer implemented system of claim 1 wherein the event comprises an expiration of a timer.

15. The computer implemented system of claim 14 wherein the computer executable code is further executable by the processor to cause the processor to enable the identification of the second set of orders to the match engine when the timer expires or when the associated match price for each order of the first set of orders would not be better than the associated order price thereof.

16. The computer implemented system of claim 1 wherein the event comprises opening of markets for one or more of the instruments associated with the first set of orders.

17. The computer implemented system of claim 1 wherein the computer executable code is further executable by the processor to cause the processor to:
list, by the processor subsequent to the receiving of each of the orders of the first set of orders, each of the received orders in an order book for the instrument associated therewith;
list, by the processor, when any of the associated match price for each order of the first set of orders would be better than the associated order price thereof, the subsequent order in the order book for the instrument associated therewith; and
communicate, by the processor via the communications network, the order book to a client device.

18. A system for improving trading efficiency of a match engine operative to match an order for an instrument with another order counter thereto to at least partially satisfy one or both of the order or the other order, the system comprising an implied opportunity identifier implemented by a processor and a non-transitory memory coupled therewith, the system further comprising:
an implied opportunity controller implemented by the processor and coupled with the implied opportunity identifier and operative to selectively disable identification, by the implied opportunity identifier, to the match engine, a first set of orders, each order of the first set of orders being for a different instrument at an associated order price, wherein if identified to the match engine, one or more of the orders of the first set of orders would be used by the match engine to at least partially satisfy, at an associated match price, the remaining orders of the first set of orders; and
wherein the implied opportunity controller is further operative to determine, subsequent to the receipt of all of the orders of the first set of orders, that an event has occurred and, based thereon further determine whether the associated match price for any order of the first set of orders would be better than the associated order price thereof, and selectively enable, when the associated match price for each order of the first set of orders would not be better than the associated order price thereof, identification to the match engine by the implied opportunity identifier, upon receipt of a subsequent order for a same instrument associated with any of the orders of the first set of orders, of a second set of orders comprising the subsequent order and a subset of orders of the first set of orders wherein, if identified to the match engine, one or more of the orders of the second set of orders would be used by the match engine to at least partially satisfy the remaining orders of the second set of orders; and
the match engine, when disabled by the processor, being operative to process each order of first set of orders upon receipt thereof to match the received order of the first set of orders with another previously received order counter thereto for the same instrument as the received order to at least partially satisfy one or both of the order or the other order and generate data indicative thereof, and when enabled by the processor, being operative to process each order of the second set of orders upon receipt thereof to match, regardless of the instrument for which the order is for, the received order of the second set of orders with another previously received order counter thereto or with another order of the second set of orders to at least partially satisfy one or both of the order or the other order and generate data indicative thereof;
the match engine being further operative to generate and communicate data indicative of a result of the processing of each order of the first set of orders to a source thereof via a communications network coupled therewith; and
wherein the match engine being unable to match an incoming order from the second set of orders with another order counter thereto from the second set of orders is avoided.

19. The system of claim 18 wherein the implied opportunity identifier is further operative to provide a plurality of exemplary order combinations, each exemplary order combination comprising a plurality of exemplar orders, each exemplar order of an exemplary order combination being for one or more instruments, wherein one or more of the exemplar orders of the exemplary order combination, if actually received, could be used by the match engine to at least partially satisfy each of the remaining exemplar orders of the exemplary order combination, if actually received; and
wherein each of the plurality of order combinations further enables the implied opportunity controller to identify the second set of orders as being capable of being identified to the match engine such that one or more of the orders of the second set of orders would be used by the match engine to at least partially satisfy the remaining orders of the second set of orders; and
further wherein the first and second sets of orders comprise one of the plurality of exemplary order combinations.

20. The system of claim 19 wherein the implied opportunity controller is further operative to, upon receipt of the subsequent order, determine a subset of the exemplary order combinations comprising an exemplar order similar to the subsequent order.

21. The system of claim 20 wherein implied opportunity controller is further operative to not enable order combinations which do not include an exemplar order similar to the subsequent order.

22. The system of claim 18 wherein the implied opportunity controller is further operative to disable identification to the match engine, a third set of orders, each order of the third set of orders being for a different instrument at an associated order price, wherein if identified to the match engine, one or more of the orders of the third set of orders would be used by the match engine to at least partially satisfy, at an associated match price, the remaining orders of the third set of orders; and
the implied opportunity controller is further operative to not enable, when the associated match price for each order of the first set of orders would not be better than the associated order price thereof, identification by the implied opportunity identifier to the match engine, upon receipt of another subsequent order for a same instrument associated with any of the orders of the third set of orders, of a fourth set of orders comprising the other subsequent order and a subset of orders of the third set of orders wherein, if identified to the match engine, one or more of the orders of the fourth set of orders would be used by the match engine to at least partially satisfy the remaining orders of the fourth set of orders.

23. The system of claim 18 wherein the implied opportunity controller is further operative to disable the identification in response to the close of markets for any of the instruments associated with the first set of orders.

24. The system of claim 18 wherein the implied opportunity controller is further operative to disable the identification in response to a market event in a market for any of the instruments associated with the first set of orders.

25. The system of claim 24 wherein the market event comprises a price exceeding a threshold.

26. The system of claim 18 wherein one of the orders if the first set of orders comprising a buy order, the match price of thereof being better than the order price thereof when the match price thereof is less than the order price thereof.

27. The system of claim 18 wherein one of the orders of the first set of orders comprising a sell order, the match price of thereof being better than the order price thereof when the match price thereof is greater than the order price thereof.

28. The system of claim 18 wherein one of the instruments associated with an order of the first set of orders comprises a spread between instruments associated with the remaining of the orders of the first set of orders.

29. The system of claim 18 wherein the event comprises receipt of the subsequent order.

30. The system of claim 29 wherein the implied opportunity controller is further operative to enable the identification by the implied opportunity identifier of the first set of orders to the match engine when the subsequent order has not been received within a defined period of time.

31. The system of claim 18 wherein the event comprises an expiration of a timer.

32. The system of claim 31 wherein the implied opportunity controller is further operative to enable the identification by the implied opportunity identifier of the second set of orders to the match engine when the timer expires or when the associated match price for each order of the first set of orders would not be better than the associated order price thereof.

33. The system of claim 18 wherein the event comprises opening of markets for one or more of the instruments associated with the first set of orders.

34. The system of claim 18 further comprising an order receiver coupled with the implied opportunity identifier and the implied opportunity controller and operative to receive each of the orders of the first set of orders and list, subsequent thereto, each of the received orders in an order book for the instrument associated therewith, list, when any of the associated match price for each order of the first set of orders would be better than the associated order price thereof, the subsequent order in the order book for the instrument associated therewith, communicate, via the communications network, the order book to a client device.

35. A system for improving efficiency of a trading system comprising a match engine means for matching an order for an instrument with another order counter thereto to at least partially satisfy one or both of the order or the other order, the system comprising:
    means for selectively disabling identification to the match engine, a first set of orders, each order of the first set of orders being for a different instrument at an associated order price, wherein if identified to the match engine, one or more of the orders of the first set of orders would be used by the match engine to at least partially satisfy, at an associated match price, the remaining orders of the first set of orders;
    means for receiving each order of the first set of orders;
    means for determining, subsequent to the receiving of all of the orders of the first set of orders, that an event has occurred and, based thereon further determining whether the associated match price for any order of the first set of orders would be better than the associated order price thereof; and
    means for selectively enabling, when the associated match price for each order of the first set of orders would not be better than the associated order price thereof, identification to the match engine, upon receipt of a subsequent order for a same instrument associated with any of the orders of the first set of orders, of a second set of orders comprising the subsequent order and a subset of orders of the first set of orders wherein, if identified to the match engine, one or more of the orders of the second set of orders would be used by the match engine to at least partially satisfy the remaining orders of the second set of orders; and
    the match engine means, when disabled by the means for selectively disabling, being operative to process each order of first set of orders upon receipt thereof to match the received order of the first set of orders with another previously received order counter thereto for the same instrument as the received order to at least partially satisfy one or both of the order or the other order and generate data indicative thereof, and when enabled by the means for selectively enabling, being operative to process each order of the second set of orders upon receipt thereof to match, regardless of the instrument for which the order is for, the received order of the second set of orders with another previously received order counter thereto or with another order of the second set of orders to at least partially satisfy one or both of the order or the other order and generate data indicative thereof;
    means for generating and communicating data indicative of a result of the processing of each order of the first set of orders to a source thereof via a communications network coupled therewith; and
    wherein the match engine means being unable to match an incoming order from the second set of orders with another order counter thereto from the second set of orders is avoided.

36. A system for improving trading efficiency of a match engine operative to match an order for an instrument with another order counter thereto to at least partially satisfy one or both of the order or the other order, the system comprising a processor and a non-transitory memory coupled therewith, the system further comprising:
    logic stored in the memory and executable by the processor to selectively disable identification to the match engine, a first set of orders, each order of the first set of orders being for a different instrument at an associated order price, wherein if identified to the match engine, one or more of the orders of the first set of orders would be used by the match engine to at least partially satisfy, at an associated match price, the remaining orders of the first set of orders; and
    wherein the logic is further executable by the processor to determine, subsequent to the receipt of all of the orders of the first set of orders, that an event has occurred and, based thereon further determine whether the associated match price for any order of the first set of orders would be better than the associated order price thereof, and selectively enable, when the associated match price for each order of the first set of orders would not be better than the associated order price thereof, identification to the match engine, upon receipt of a subsequent order for a same instrument associated with any of the orders of the first set of orders, of a second set of orders comprising the subsequent order and a subset of orders of the first set of orders wherein, if identified to the match engine, one or more of the orders of the second set of orders would be used by the match engine to at least partially satisfy the remaining orders of the second set of orders; and the match engine, when disabled by the logic, being operative to process each order of first set of orders upon receipt thereof to match the received order of the first set of orders with another previously received order counter thereto for the same instrument as the received order to at least partially satisfy one or both of the order or the other order and generate data indicative thereof, and when enabled by the logic, being operative to process each order of the second set of orders upon receipt thereof to match, regardless of the instrument for which the order is for, the received order of the second set of orders with another previously received order counter thereto or with another order of the second set of orders to at least partially satisfy one or both of the order or the other order and generate data indicative thereof;

the match engine being further operative to generate and communicate data indicative of a result of the processing of each order of the first set of orders to a source thereof via a communications network coupled therewith; and wherein the match engine being unable to match an incoming order from the second set of orders with another order counter thereto from the second set of orders is avoided.

* * * * *